United States Patent [19]
Garcia et al.

[11] Patent Number: 5,631,514
[45] Date of Patent: May 20, 1997

[54] MICROFABRICATED MICROENGINE FOR USE AS A MECHANICAL DRIVE AND POWER SOURCE IN THE MICRODOMAIN AND FABRICATION PROCESS

[75] Inventors: Ernest J. Garcia; Jeffry J. Sniegowski, both of Albuquerque, N.M.

[73] Assignee: The United States of America as represented by the United States Department of Energy, Washington, D.C.

[21] Appl. No.: 257,317

[22] Filed: Jun. 9, 1994

[51] Int. Cl.⁶ .............................. F16H 21/22; H02N 1/00
[52] U.S. Cl. ................................. 310/309; 310/40 MM; 74/44
[58] Field of Search .................... 310/20, 40 MM, 310/80, 308, 309; 74/44

[56] References Cited

U.S. PATENT DOCUMENTS

| | | | |
|---|---|---|---|
| 1,348,859 | 8/1920 | Frech | 74/44 |
| 1,471,847 | 10/1923 | Holliday | 74/44 |
| 2,174,981 | 10/1939 | Kahn | 74/44 |
| 2,184,839 | 12/1939 | Howard | 74/44 |
| 2,775,899 | 1/1957 | Vagneur | 74/44 |
| 4,613,782 | 9/1986 | Mori et al. | 310/328 |
| 5,043,043 | 8/1991 | Howe et al. | 156/645 |
| 5,093,594 | 3/1992 | Mehregany | 310/82 |
| 5,180,940 | 1/1993 | Paratte et al. | 310/309 |
| 5,189,323 | 2/1993 | Carr et al. | 310/40 MM |
| 5,191,251 | 3/1993 | Paratte | 310/309 |
| 5,378,954 | 1/1995 | Higuchi et al. | 310/309 |
| 5,428,259 | 6/1995 | Suzuki | 310/309 |

OTHER PUBLICATIONS

L. Fan et al., "Integrated Movable Micromechanical Structures of Sensors and Actuators," *IEEE Transactions on Electron Devices*, vol. 35, No. 6, Jun. 1988, pp. 724–730.

W. Tang et al., "Laterally Driven Polysilicon Resonant Microstructures," *Proceedings of IEEE MicroElectroMechanical Systems Workshop*, Feb. 20–22, 1989, pp. 53–59.

M. Mehregany et al., "Friction and Wear in Microfabricated Harmonic Side–Drive Motors," *IEEE Solid State Sensor and Actuator Workshop*, Jun. 4–7, 1990, pp. 17–22.

V. Dhuler et al., "Micromotor Operation in a Liquid Environment," *Proceedings of IEEE Solid-State Sensor an Actuator Workshop*, Jun. 22–25, 1992, pp. 10–13.

Gannon, Robert; "Micromachine Magic"; *Popular Science*; pp. 88–92 & p. 143 Mar. 1989.

*Primary Examiner*—Clayton E. LaBalle
*Attorney, Agent, or Firm*—Luis M. Ortiz; James H. Chafin; William R. Moser

[57] ABSTRACT

A microengine uses two synchronized linear actuators as a power source and converts oscillatory motion from the actuators into rotational motion via direct linkage connection to an output gear or wheel. The microengine provides output in the form of a continuously rotating output gear that is capable of delivering drive torque to a micromechanism. The microengine can be operated at varying speeds and its motion can be reversed. Linear actuators are synchronized in order to provide linear oscillatory motion to the linkage means in the X and Y directions according to a desired position, rotational direction and speed of said mechanical output means. The output gear has gear teeth on its outer perimeter for directly contacting a micromechanism requiring mechanical power. The gear is retained by a retaining means which allows said gear to rotate freely. The microengine is microfabricated of polysilicon on one wafer using surface micromachining batch fabrication.

21 Claims, 30 Drawing Sheets

5,631,514

MICROFABRICATED MICROENGINE FOR USE AS A MECHANICAL DRIVE AND POWER SOURCE IN THE MICRODOMAIN AND FABRICATION PROCESS

The present invention was conceived and developed in the performance of a U.S. Government Contract. The U.S. Government has rights in this invention pursuant to contract No. DE-AC04-76DP00789 between the United States Department of Energy and American Telephone and Telegraph Company.

FIELD OF THE INVENTION

The present invention relates generally to microengines or micromotors. More specifically, the invention is directed to a microengine microfabricated of polysilicon having an output gear that is rotated by synchronized linear actuators that are linked to the output gear in order to cause rotation of the gear, thus providing a source of torque to micromechanisms requiring mechanical energy. The invention is adaptable to applications involving defense, bio-medical, manufacturing, consumer products, aviation, automotive, computer (micro hard disks), inspection, and safety systems.

BACKGROUND FOR THE INVENTION

In the field of micromechanics, mechanical devices are of the scale of micrometers. A suitable power source for supplying continuous rotational motion to other micromechanisms does not currently exist. There are micrometer sized electrostatic micromotors that display rotational motion but are unable to drive a mechanical load. This is due to several reasons which chief among them is the inability to produce an output shaft from the micromotor. Furthermore, there is great difficulty in connecting a mechanical load to the perimeter of the rotor itself because the location of stators which are used to electrostatically or electromagnetically drive the device, interfere with external connections.

FIG. 1 illustrates a prior art micromotor that suffers from the above described limitations. As explained in Mehregany et at., "Friction and Wear in Microfabricated Harmonic Side-Drive Motors", IEEE Solid State Sensor and Actuator Workshop, Hilton Head Island, S.C., June 4–7, IEEE Catalogue No. 90CH2783-9, pages 17–22, the prior art provides a micromotor including a rotor pinned to a substrate or stator by a central bearing that restricts its lateral and axial motion. The entire structure shown in the prior art was micromachined from silicon using deposition and etching steps referred to as surface micromachining in the art. The manner of energizing the rotor is via a variable-capacitance, side-drive arrangement, wherein stator poles are arranged about the periphery of the rotor. By appropriate energization of the side-deposited stator poles using a multi-phase signal, rotation of the rotor is achieved.

The existing micromotor comprises a typical center-pin bearing side drive micromotor. In this side-drive design, torque is derived via position-dependent capacitance between the rotor and stator poles. However, because of the side-by-side arrangement of the rotor and stator poles, field coupling is less than optimal and, as a result, the torque characteristics of the motor suffer. Furthermore, twelve stators surrounding the perimeter of the 8-pole rotor connected to the center-pin bearing make access to the rotor difficult. The rotor itself does not allow transmission of power off its perimeter because gear teeth cannot be used. Also, the center pin about which the rotor rotates is fixed and cannot serve as a shaft for power take-off.

Thus, there is an existing need for a micromotor/engine design that will provide direct output mechanical power directly to micromechanisms without interference from the structure of the micromotor.

SUMMARY OF THE INVENTION

It is therefore an objective of the present invention to fulfill the need for a microfabricated microengine that overcomes the shortcomings of prior art micromotors by providing a microengine which provides useful output power to a mechanical load directly from the rotating source. In view of the above-described needs, the present invention provides output power to a micromechanism load directly from a rotating motor gear which is the source of torque typically untapped by the prior art. Stators and rotors are not used in the present invention's design. Unlike the prior art, this invention uses synchronized linear actuators as the power source which converts linear oscillatory motion from the actuators into rotational motion via a direct linkage connection near the perimeter of an output gear. The microengine design provides output in the form of a continuously rotating output gear that is capable of delivering drive torque directly to a micromechanism. The microengine can be operated at varying speeds and its motion can be reversed. The entire microengine is fabricated of polysilicon on one wafer using surface micromachining batch fabrication techniques. Fabrication of the device is accomplished without the need for assembly of multiple wafers requiring alignments, bonding, or the addition of other separately fabricated piece parts.

Using an 8 mask process, the microengine can be produced in such a way that interferences between drive linkages, linear actuators, and the rotating output gear are eliminated. Structural non-interference is accomplished by a unique positioning and layout of the joints, links, gear, gear hub, and actuators during the patterning and etching of these films. Upon final sacrificial etch and release, clearances are such that full rotation of the gear is accomplished without interference.

During the 8 mask process, the microengine is fabricated using surface micromachining of multiple polysilicon films with intervening sacrificial oxide films. The fabrication of the microengine including the electrostatic comb drives, the power output gear, and the interconnecting linkages requires one deposition of electrical interconnect polysilicon and three depositions of mechanical construction polysilicon. The electrical polysilicon provides a voltage reference plane and serves as an electrical interconnect layer for the actuators.

Additional objects, advantages, and novel features of the invention will become apparent to those skilled in the art upon examination of the following description or may be learned by the practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form part of the specification, illustrate an embodiment of the present invention and, together with the description, serve to explain the operation, features, and advantages of the invention.

DETAIL DESCRIPTION OF THE PREFERRED EMBODIMENTS

Figure 1:
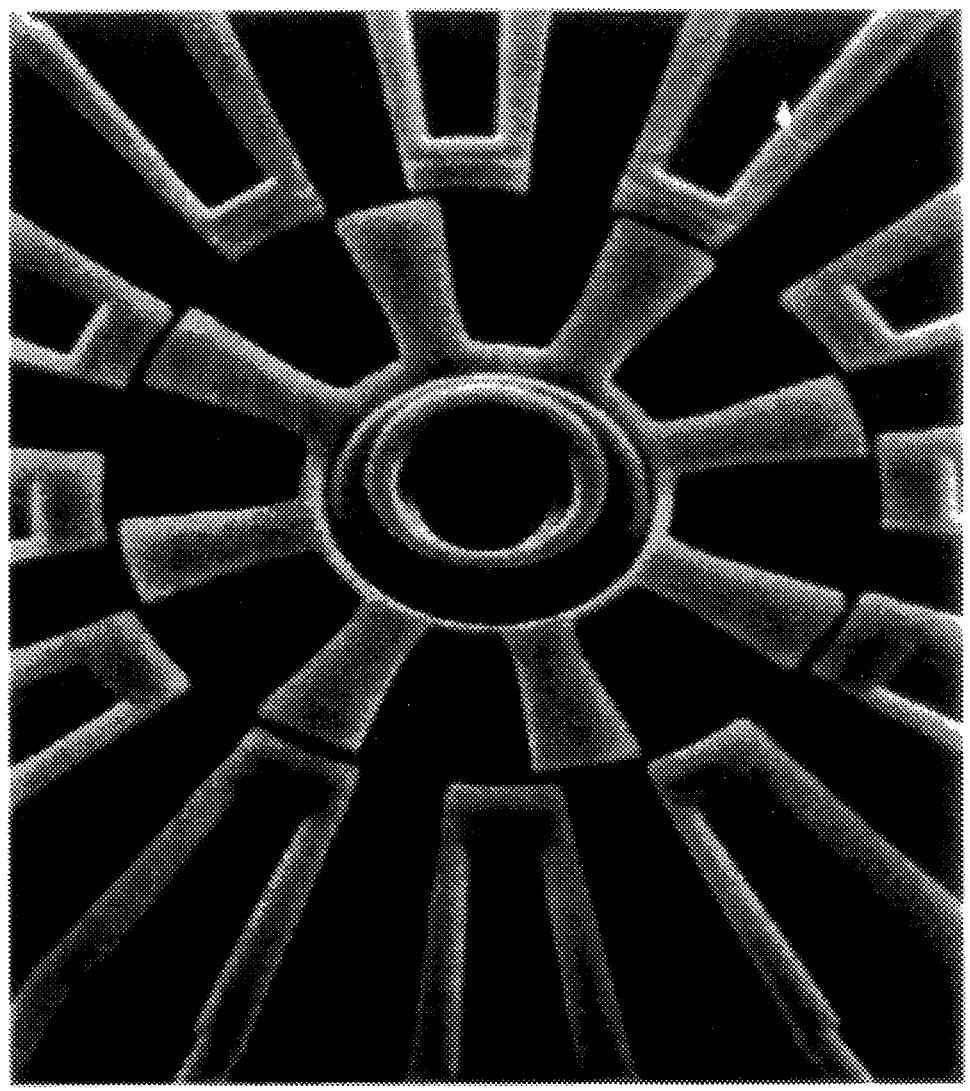
FIG. 1 is a illustration of a prior art design of a microengine.
Figure 2:
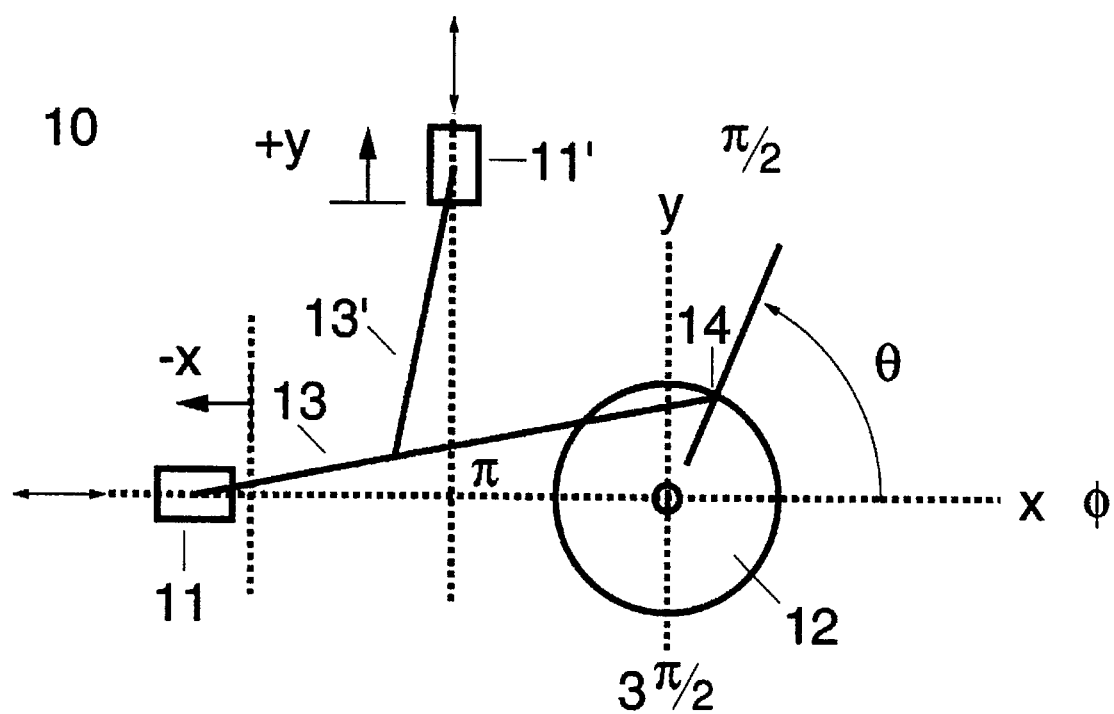
FIG. 2 is an illustration of the basic conversion of linear motion to rotational motion as provided by the present invention.

Referring to FIG. 2, the basic microengine concept provides output in the form of a continuously rotating output gear that is capable of delivering drive torque to a micromechanism (not shown). The microengine 10 uses linear actuators 11 and 11' as a power source, and converts linear oscillatory motion from the actuators into rotational motion of a gear 12 via direct linkages 13 and 13'. Linear actuators that can be used to drive the system include electrostatic actuators, electromagnetic actuators, pneumatic actuators, piezoelectric actuators, shape memory alloy actuators, and phase change actuators. The prototype of the invention utilizes the linear electrostatic comb drive actuator concept wherein a comb drive actuator is used as the power source and the embodiment converts linear oscillatory motion from comb drive actuators into rotational motion via a direct linkage to the outer perimeter of the output gear. The output gear 12 is rotated by forces applied to 12 through linkage 13, which is connected to 12 at joint 14, as a result of synchronized motion of the actuators 11 and 11' in the X and Y axis. For rotation of the gear 12 to occur, the gear 12 is rotated from 0 to $\pi/2$ radians by movement of actuator 11 in the negative X direction while actuator 11' is pulling in the positive Y direction. The gear is then rotated from $\pi/2$ to $\pi$ by the continued pulling of actuator 11 in the negative X direction and a pushing of actuator 11' in the negative Y direction. The gear is then rotated from $\pi$ to $3\pi/2$ by the continued pushing of actuator 11' in the negative Y direction as well as the pushing of actuator 11 in the positive X direction. The gear 12 completes its 360° rotation ($2\pi$ radians) through the continued pushing of actuator 11 in the positive X direction and the pulling of actuator 11' in the positive Y direction. The actuators 11 and 11' continue this process resulting in continued rotation of the gear 12. The gear can also reverse its rotation by reversing the operation of the actuators. Gear speed can be adjusted by changing the timing of the actuators 11 and 11', and by adjusting the amount of power provided to the actuators.

Figure 3:
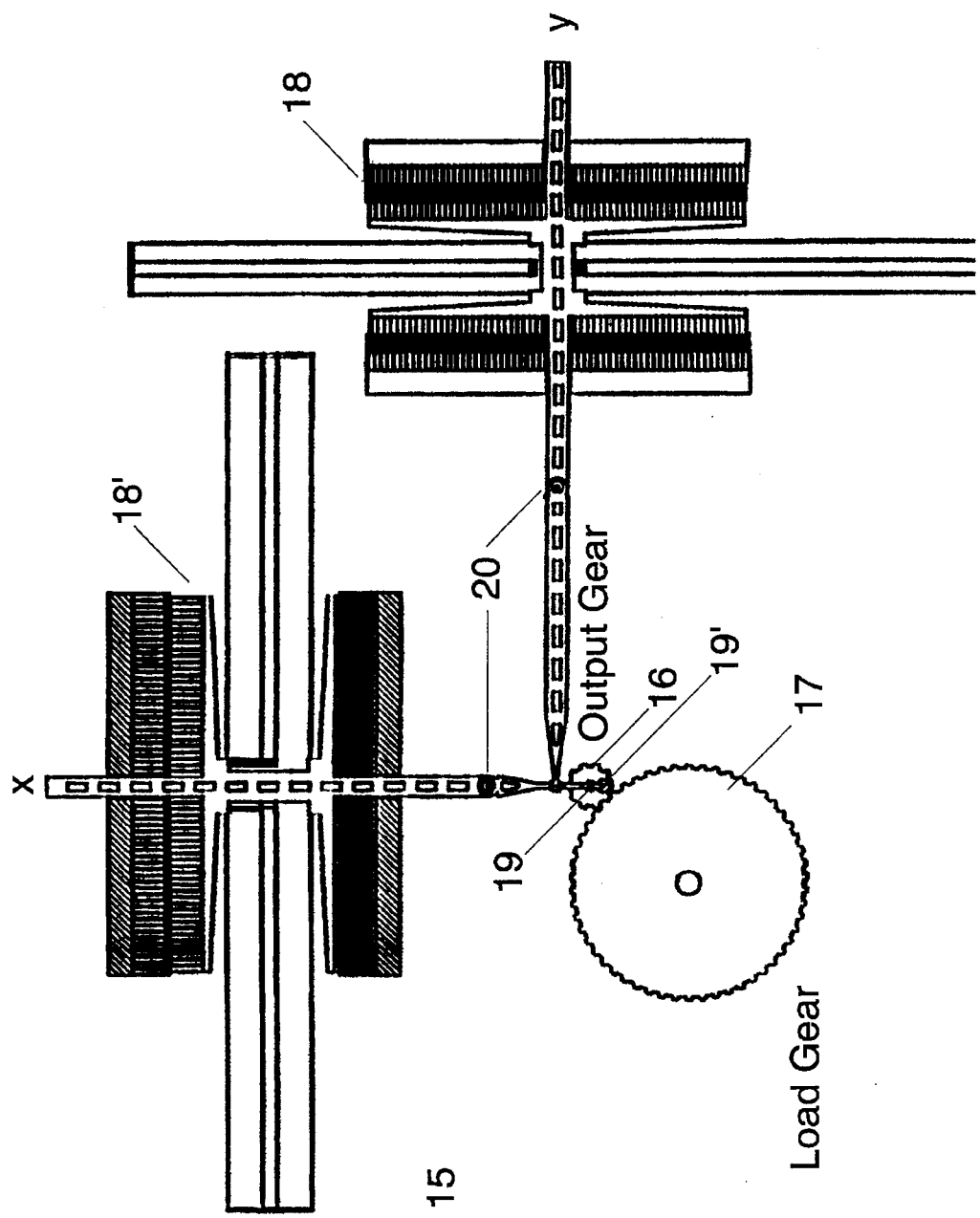
FIG. 3 is an illustration of the microengine of the present invention.

Referring to FIG. 3, the microengine 15 provides output in the form of a continuously rotating output gear 16 that is capable of delivering drive torque to a micromechanism which is depicted as a load gear 17. The comb drive actuators 18 and 18' are shown in their respective locations on the X and Y axis. The direct linkage system 19 and 19' illustrates how linkage to the gear is established. A first actuator 18' is directly linked near the outer perimeter of the gear by a pin joint 19'. The second actuator 18 is then linked to the linkage mechanism of the first actuator 18' by an interconnecting link 19 which is also a pin joint. The linkages for both actuators have pin joints 20 to allow for motion of the linkages and the gear. Flexibility can be accomplished by incorporating either pin joints 20 as illustrated or by using elastic material joints which is well known in the art. For example, elastic joints rather than pin joints could be used in place of pin joints 19 and 20. An elastic joint is a thin section that replaces a pin joint and allows for relative motion by the bending action of the thin section (see FIG. 13). Pin joint 19' which is connected to the gear 16 must be able to rotate freely through 360° which is only possible with a pin joint. Therefore, pin joint 19' cannot be replaced by an elastic joint.

Figure 4:
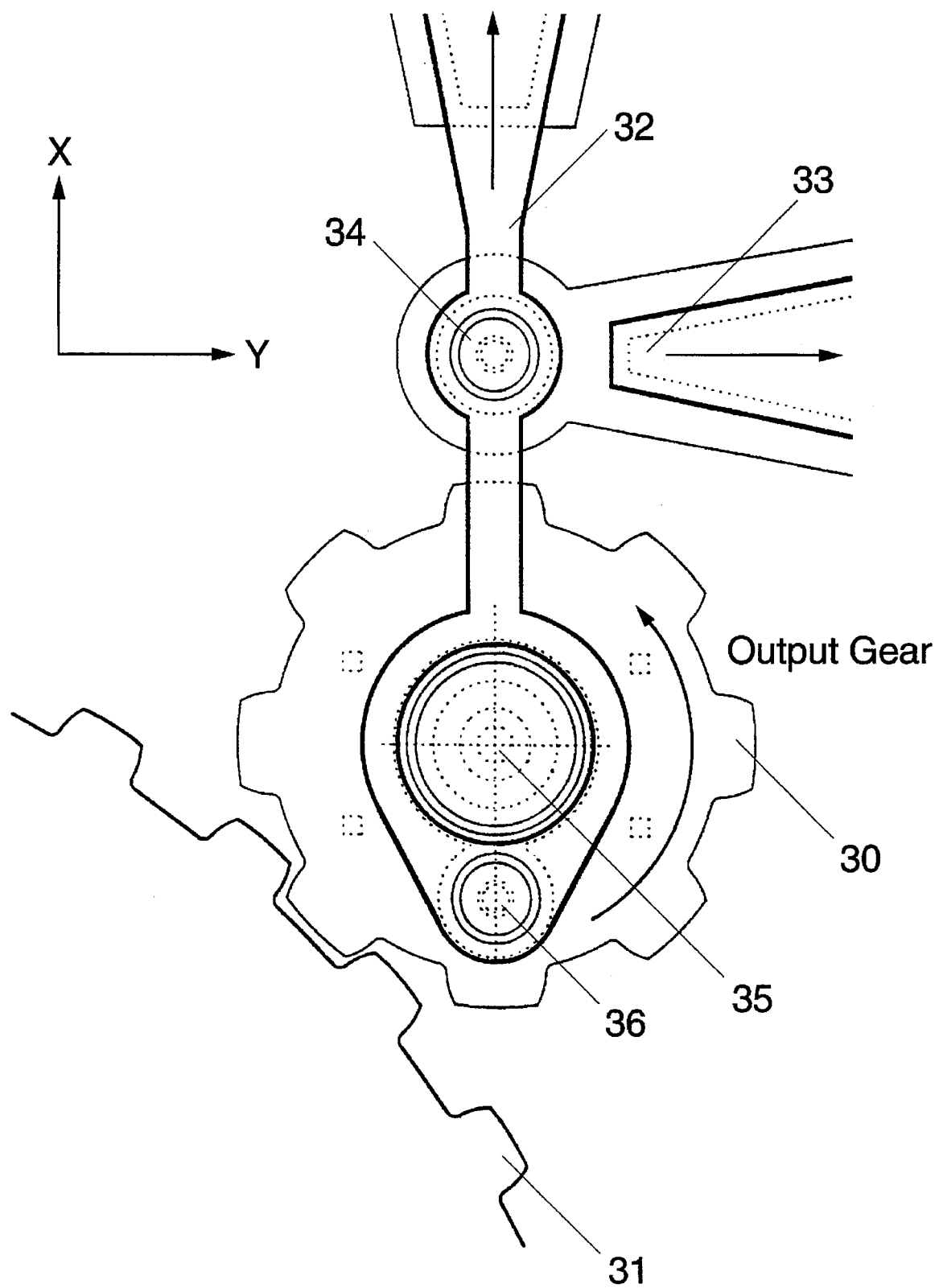
FIG. 4 is a blown-up illustration of the gear/link design of the present invention.

The entire microengine is fabricated of polysilicon (or other suitable materials) on one wafer using surface micromachining batch fabrication techniques which are well known in the art. Fabrication of the device is accomplished without the need for assembly of multiple wafers requiring alignments, bonding, etc., or the addition of other separately fabricated piece parts. The design utilizes a gear 30 connected by a pin joint 36 to links 32 and 33 which produce rotational or linear motion to a load 31 as illustrated by the arrow in FIG. 4. However, the fabrication of gears with links by surface micromachining techniques presents several fundamental difficulties. In general, these difficulties are due to the vertical topology (out of the plane of the gear) introduced by the deposition and etching of the various films used. Link/gear interferences which occurs with normally deposited films used in surface micromachining have been alleviated by the present microengine design and fabrication process. The interference normally arises when the interconnecting link 34 must pass over the gear 30 edge or the retaining hub 35 of the gear as the mechanism moves through a complete rotational cycle.

Figure 5A:
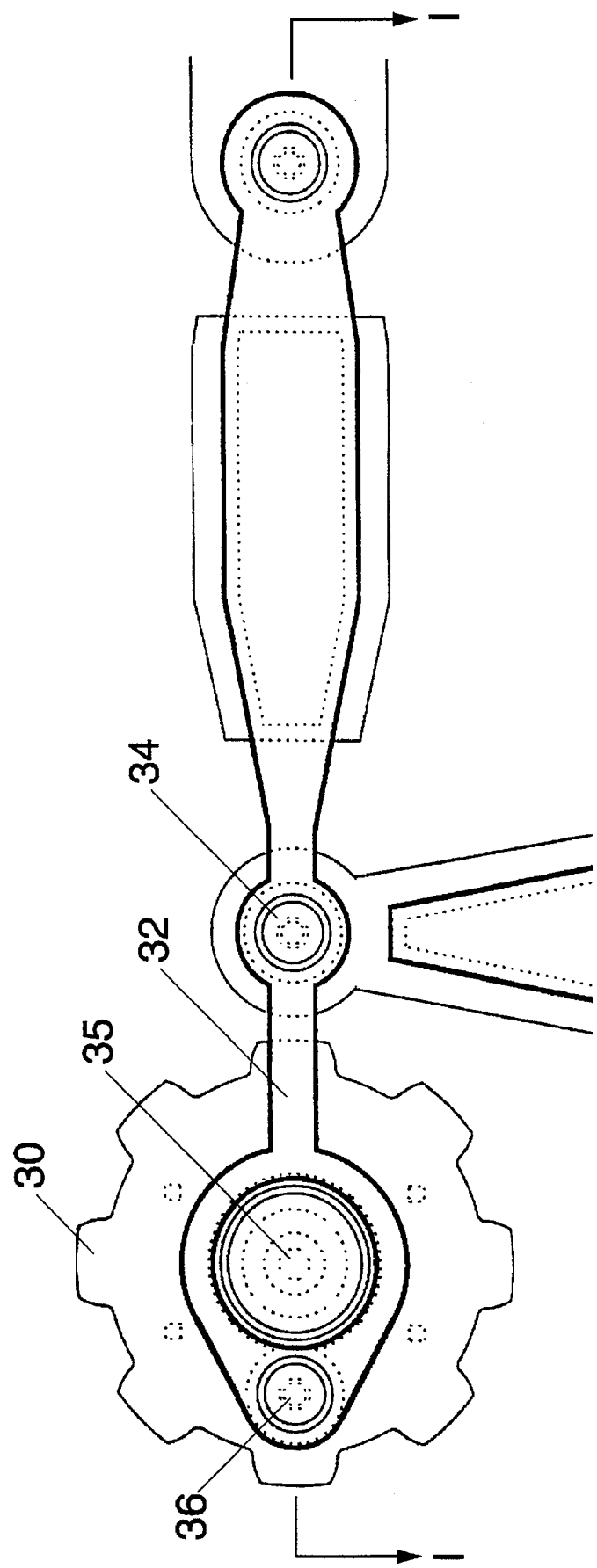
FIG. 5A is an illustration of the link, gear hub, and gear of the present invention after patterning and etching of the polysilicon films wherein clearances are such that full rotation is accomplished without interference from the individual parts that comprise the microengine.
Figure 5B:
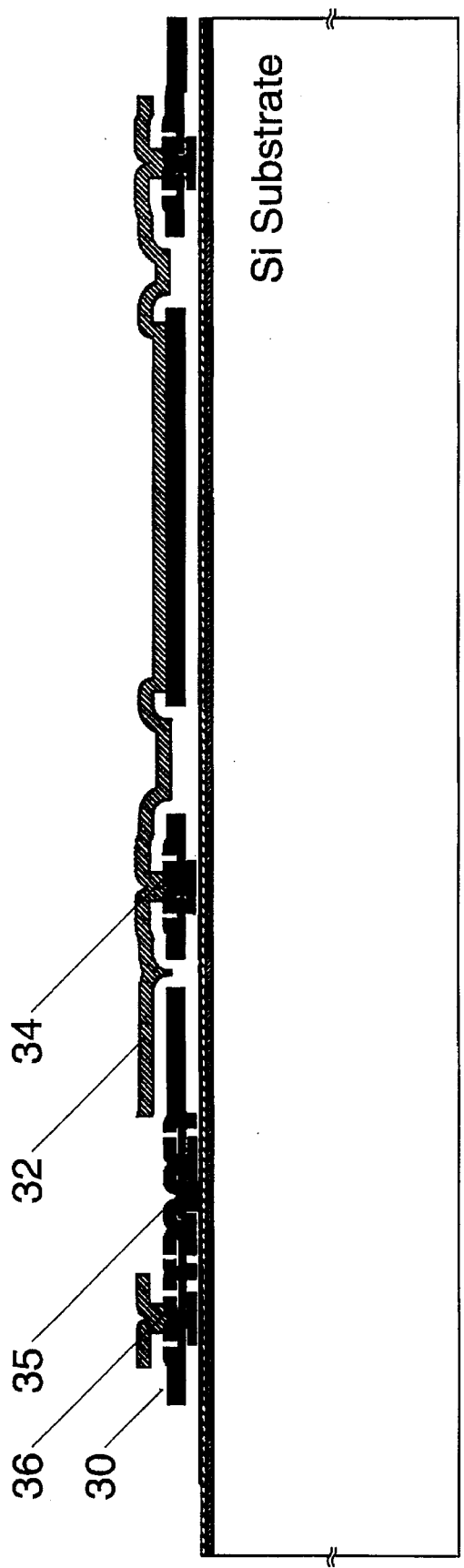
FIG. 5B is a sectional view of the link, gear hub and gear of the present invention taken along line I—I of FIG. 5A.

Using an 8 mask process, the microengine can be produced in a way that avoids previous difficulties. Noninterfering rotary motion of the system can be accomplished by a unique positioning and layout of the links 32 and 33, gear hub 35, and gear 30 during the patterning and etching of these films. Upon final sacrificial etch and release, clearances are such that full rotation is accomplished without interference as illustrated in FIGS. 5A and 5B.

The microengine is formed using surface micromachining of multiple polysilicon films with intervening sacrificial oxide films. The fabrication of the microengine including the electrostatic comb drives, the power output gear, and the interconnecting linkages require three depositions of mechanical construction polysilicon and one deposition of electrical interconnect polysilicon. The electrical polysilicon provides a voltage reference plane and serves as an electrical interconnect layer. The electrical polysilicon is referred to as POLY0, and the first, second, and third mechanical polysilicon films are referred to as POLY1, POLY2, and POLY3, respectively.

Figure 6A:
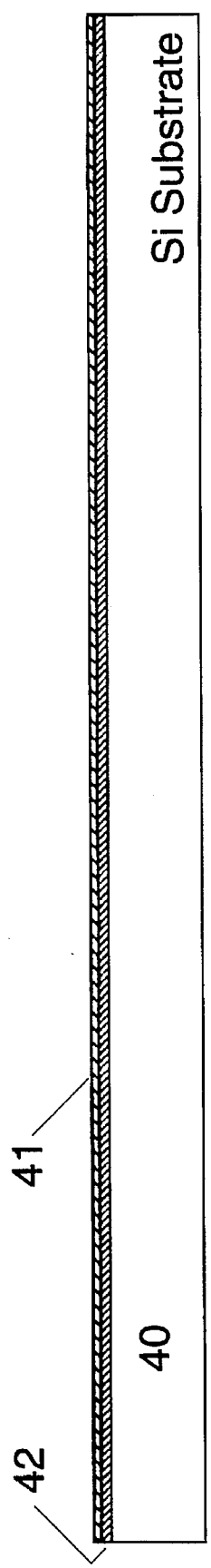
FIGS. 6a–6q are illustrations of the microengine fabrication process.

Referring to FIG. 6a, a silicon substrate 40 is coated with dielectric isolation films 41 of Low Pressure Chemical Wapor Deposition (LPCVD) silicon-rich nitride at about 8000 Å over a thermal oxide 42 at about 6300 Å as a blanket starting point. The reason for the blanket isolation films is to assure that proper electrical isolation is achieved between electrically active parts of the micro-engine structures.

Figure 6B:
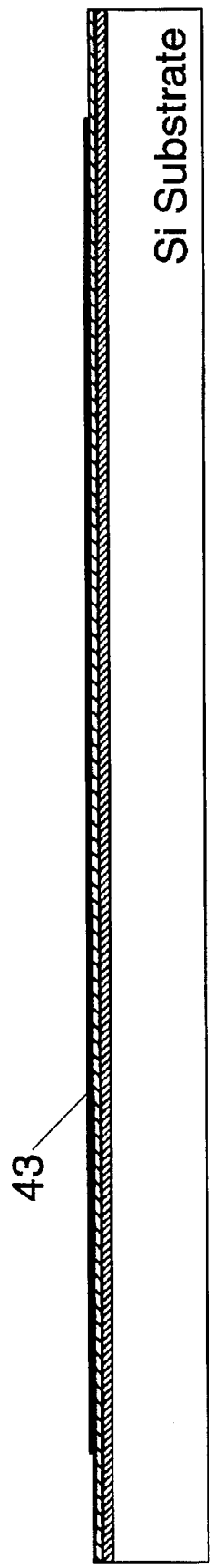
Figure 6C:
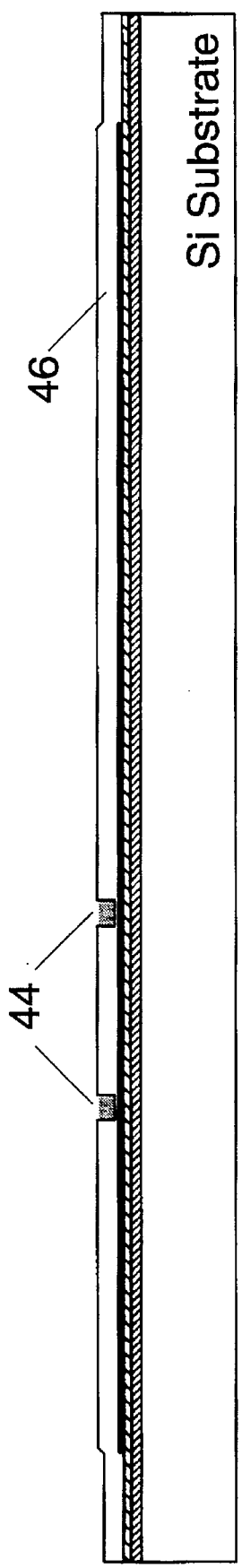
Figure 6D:
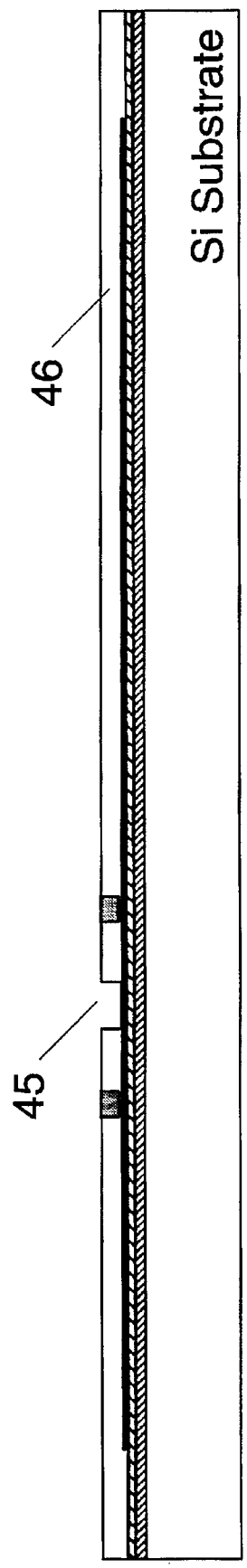
Figure 6E:
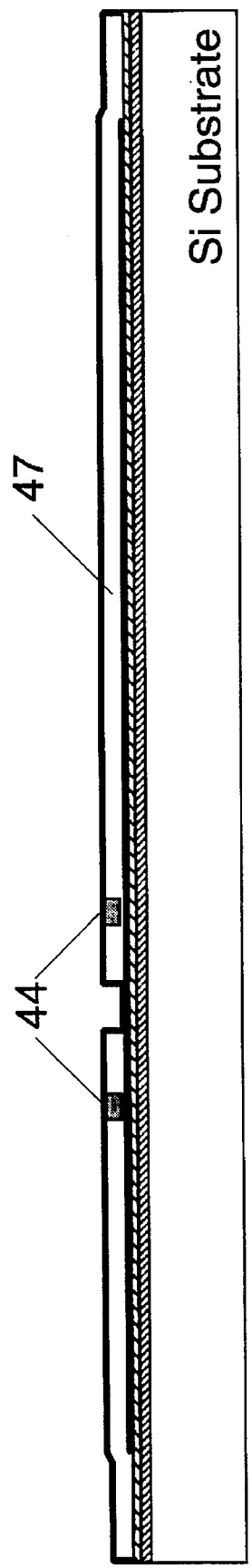
Figure 6F:
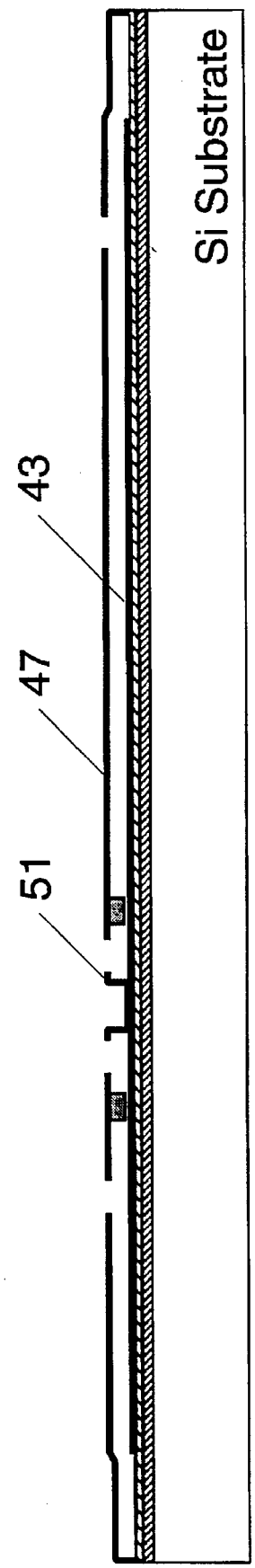
Figure 6G:
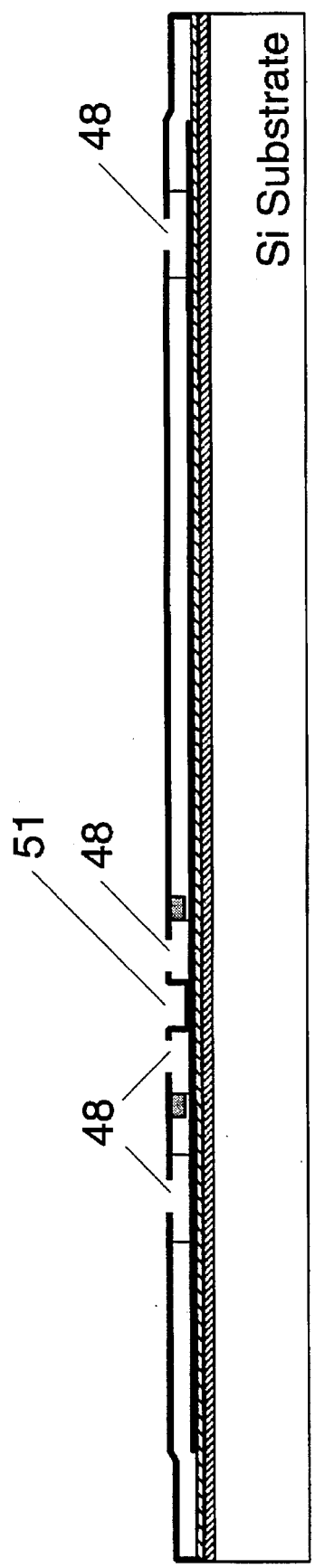

Referring to FIG. 6b, the first patterned and etched layer 43, mask #1, is the electrical interconnect and shield polysilicon, referred to as POLY0. This film is not structural and is kept relatively thin, e.g., about 3000 Å. All mechanical polysilicon depositions are LPCVD, fine-grained polycrystalline silicon deposited at 580° C. The electrostatic comb drives (not shown), stiction reduction dimple molds 44, FIG. 6c, and stator-to-substrate anchor areas 45, FIG. 6d, are patterned into the first thick sacrificial glass layer 46 ($\approx$2 µm) deposited after POLY0, with masks #2 and #3 respectively. The dimple mold bushings are about 1.5 µm deep. Referring to FIG., 6e, a subsequent polysilicon film 47 (POLY1) is deposited and fills in the anchor and dimple mold areas to provide attachment of the structure anchors (not shown) to the substrate, and to form 'dimples' 44 on the otherwise flat underside of the polysilicon 47 (the microengine gear underside) for stiction reduction. The POLY1 layer consists of about 1000 Å of in situ phosphorus doped poly (570° C.), 500 Å undoped poly (570° C.) and 8500 Å undoped (580° C.) Vertical Tube Reactor (VTR) poly. The comb drives and output gear are constructed from the first and second layers of construction polysilicon (POLY1 and POLY2), while the X and Y interconnecting links are formed from a composition of all three construction poly films. Sacrificial glass layers are used between all polysilicon levels. Referring to FIG. 6f, the substrate anchor for the flanged restraining hub 51 for the output gear is formed from the POLY1 deposition 47 with the hub anchor 45 being formed by a process in which the POLY1 level 47 is deposited and etched with mask #4, as illustrated at FIG. 6f. Partial undercut etch 48, FIG. 6g, of the sacrificial glass under POLY1 is done to begin to form the basis 51 for a flanged hub. The hub joint and link connections to the comb drives (not shown) and the output gear are of the flanged typed and are formed by a process similar to and described by Mehregany et at., "Friction and Wear in Microfabricated harmonic Side-Drive Motors", IEEE Solid State Sensor and Actuator Workshop, Hilton Head Island, S.C., June 4–7, IEEE Catalogue No. 90CH2783-9, pages 17–22. Only the areas where the poly needs to be undercut to form flanges is opened. If done this way, no additional mask level is needed since the poly will be its own mask.

Figure 6H:
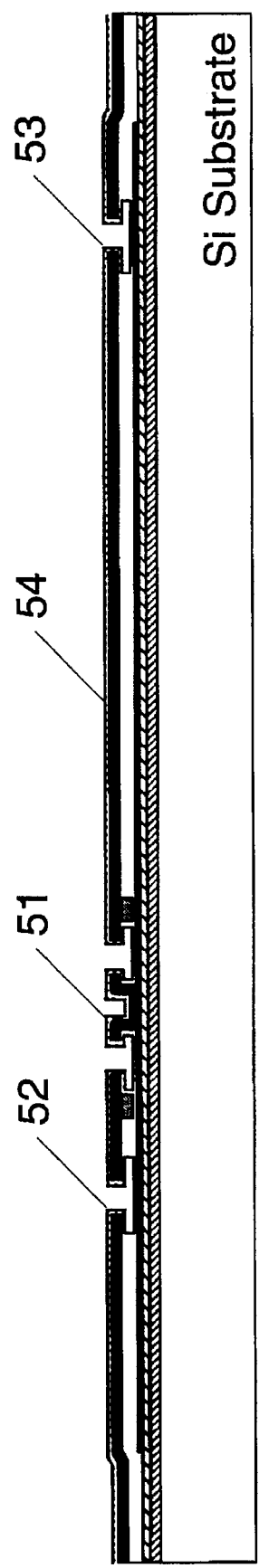
Figure 6I:
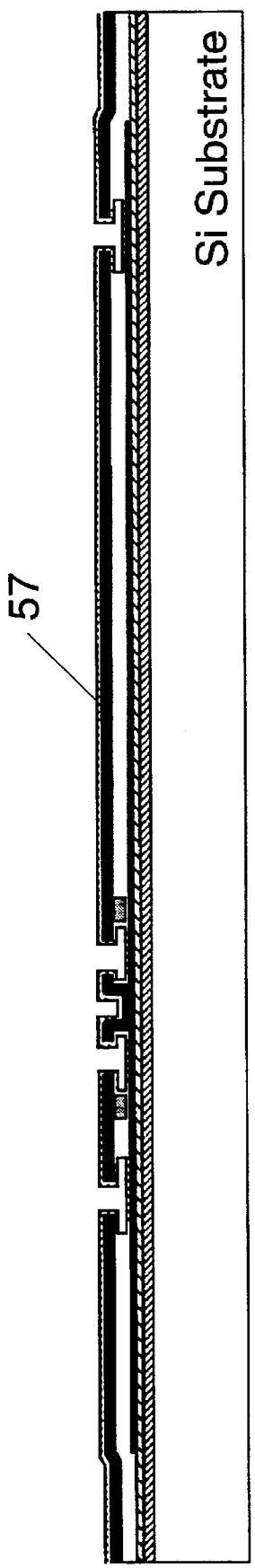
Figure 6J:
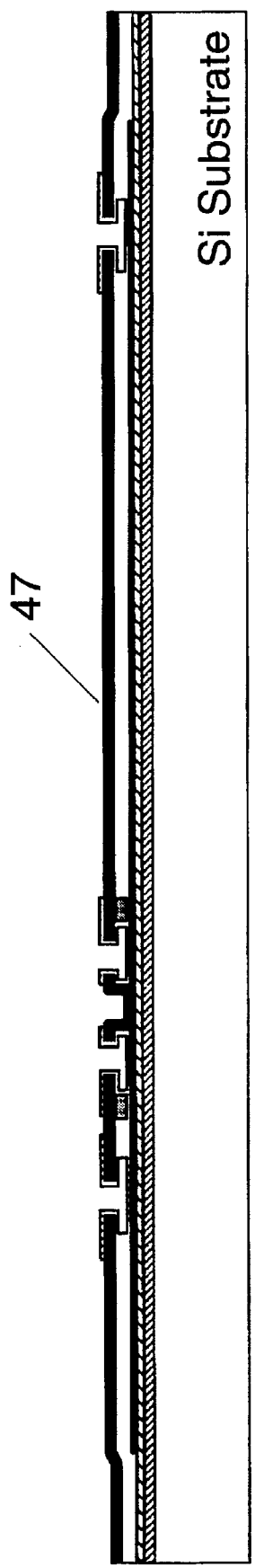

Referring to FIG. 6h, the partial undercut is backfilled by a thin ($\leq$0.5 µm) oxide deposition 54 to form the spacing between the hub anchor 51 and the gear 52 and link 53 joints. This oxide is patterned by mask #5 to remain only in the joint and bearing areas (FIG. 6j). At this point, the POLY2 is deposited. The polysilicon deposition is conformal—meaning that it uniformly coats any surface including backfilling the flange undercut.

Referring back to FIG. 6i, a low-stress silicon nitride friction reduction layer 57 can be deposited at about 1500 Å before the POLY2 deposition to form a friction reduction layer on the flanged surfaces.

Figure 6K:
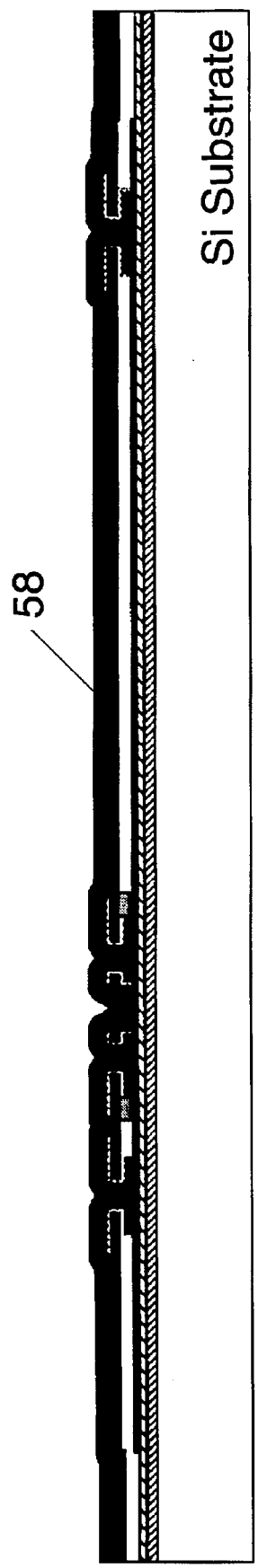
Figure 6I:
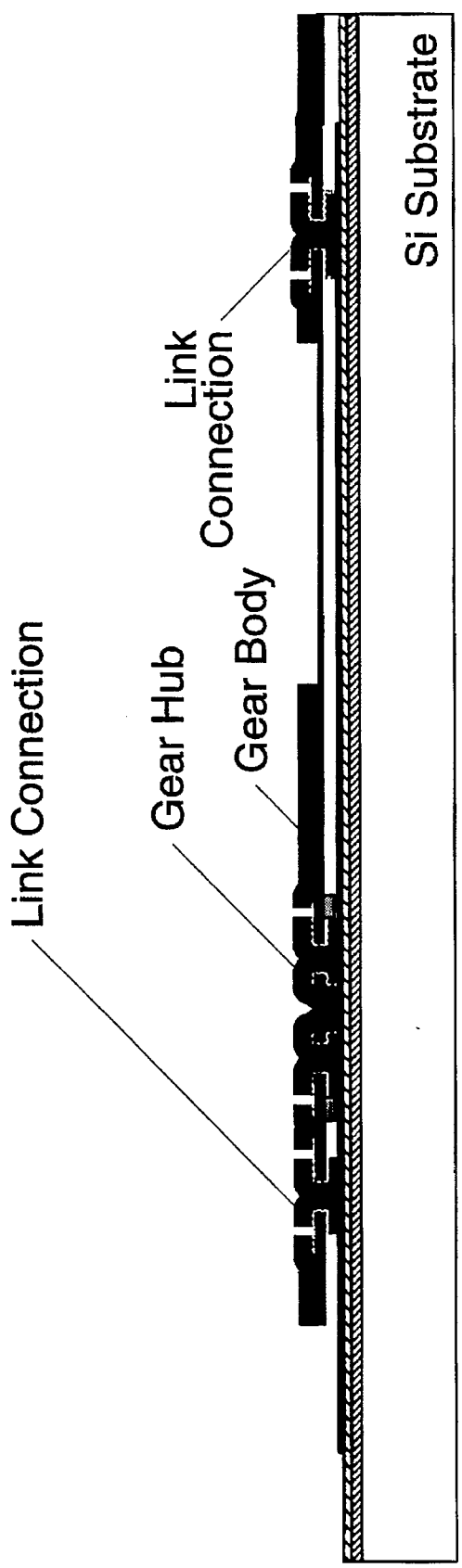
Figure 6M:
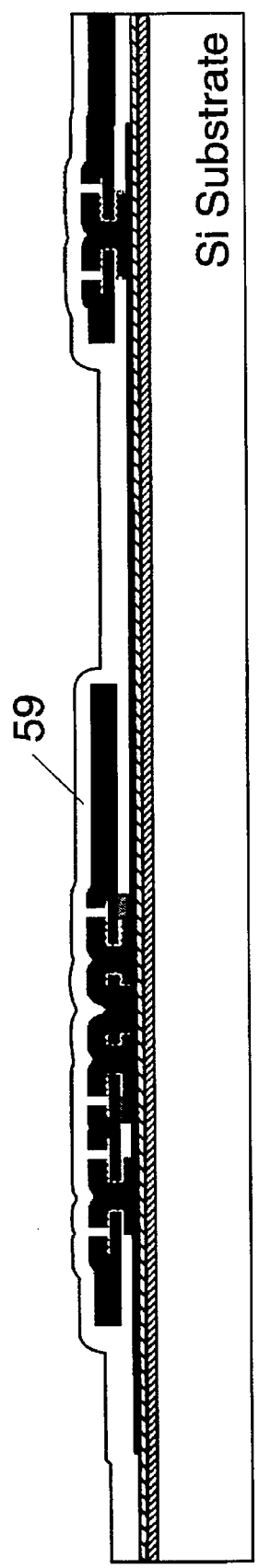
Figure 6N:
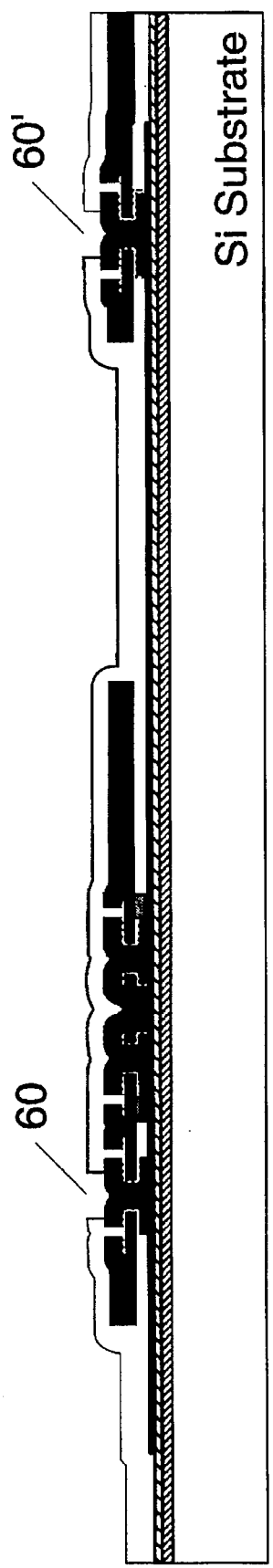
Figure 6O:
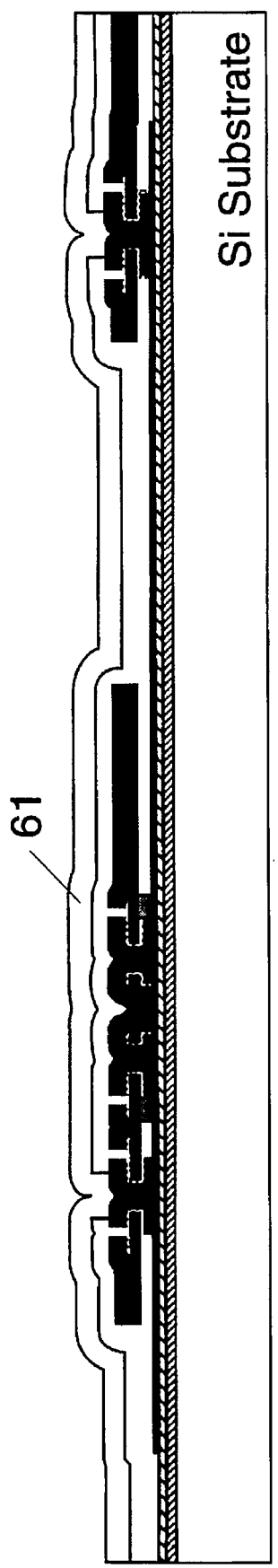
Figure 6P:
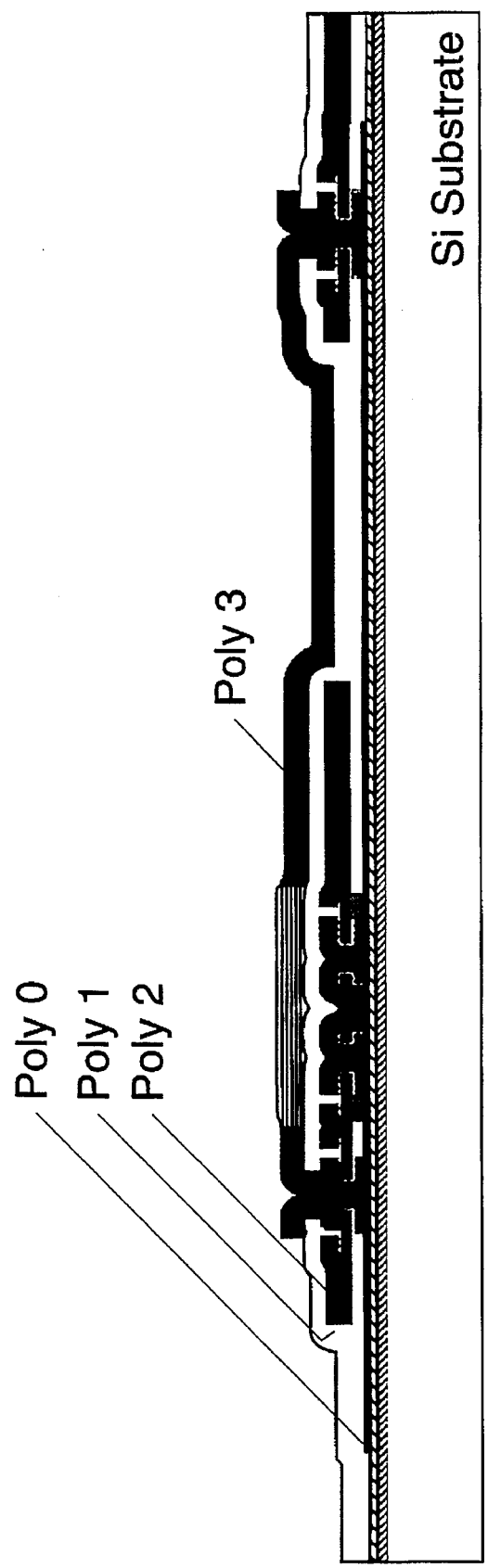
Figure 6Q:
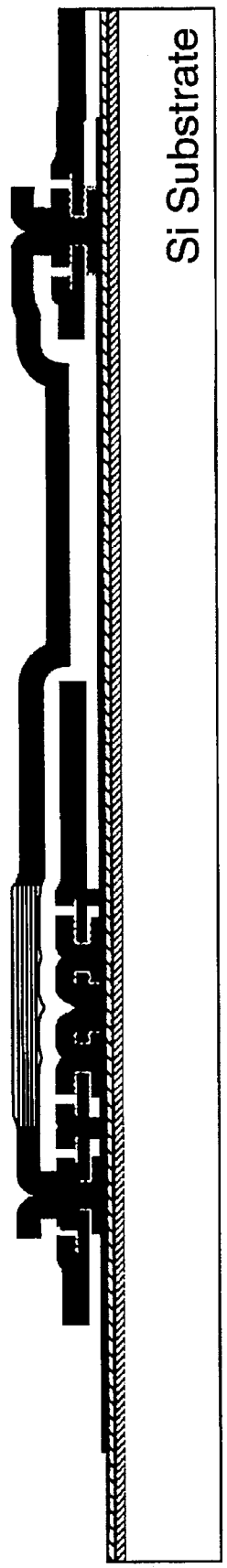

Referring to FIG. 6j, in the areas outside the joints and bearing where the flange spacer oxide was removed, the POLY2 (not yet shown) deposits directly on POLY1 47 to form a single layer of polysilicon. The SiN/oxide layers are patterned and etched to allow the adhesion of the POLY2 layer to the POLY1 layer. Referring to FIG. 6k, after the POLY2 deposition, a single layer 58 is what the gear body, parts of the links, and the comb drives are comprised of. The polysilicon sandwich is patterned and etched, see FIG. 6l, with definition by mask #6 to form the above parts. This sequence of depositions and critical dimensions produces nearly planar surfaces over the gear and joints. This permits non-interference of the gear/link assembly during operation. After the definition with mask #6, the second major sacrificial glass layer 59, FIG. 6m, is deposited to a thickness on the order of about 2 µm. Referring to FIG. 6n, mask #7 is used to define the anchor areas 60 and 60' for POLY3 61 (FIG. 6o) which is deposited, patterned, and etched using mask #8 to form the final link portions to connect the entire assembly as illustrated in FIGS. 6o–6p. The anchor etches are critical. As shown on the rotor pins 60 and 60', the opening is only about 4 µm in diameter and the tolerance to the edge of the pin is only about 1 µm. Thus the etch will probably need to be done in a dry etch if possible, otherwise, either opening must be biased smaller or the pin joint flange made larger to accommodate the blow out by a wet etch. A cross-section, as seen in FIG. 6p, just prior to the final release presents an overview of all the poly and sacrificial films used. A final HF release etch produces the completed microengine assembly as shown in FIG. 6q. Release etch of the structure produces a free-standing microengine. The polysilicon film thickness (POLY0, POLY1, POLY2 and POLY3) used for the prototype embodiment are 0.3 µm, 1 µm, 1.5 µm and 2.0 µm respectively. At two intermediate steps, namely after the POLY2 and POLY3 depositions, suitable post-deposition anneals must be done to assure that the polysilicon construction films do not display undesirable internal stress that would distort the structure upon the final release etch.

Figure 7:
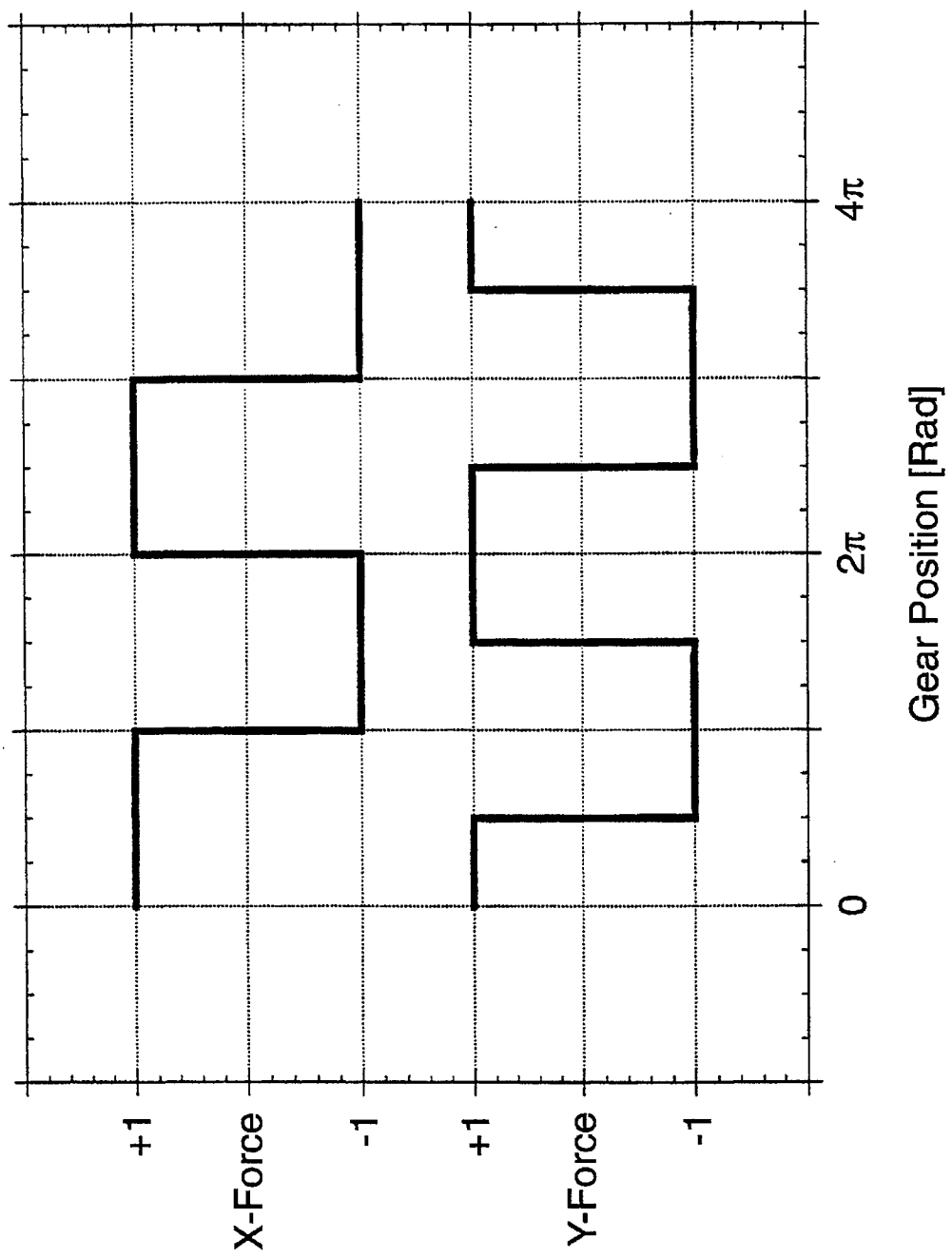
FIG. 7 is a plot of the normalized square wave input forces as a function of output gear angle.
Figure 8:
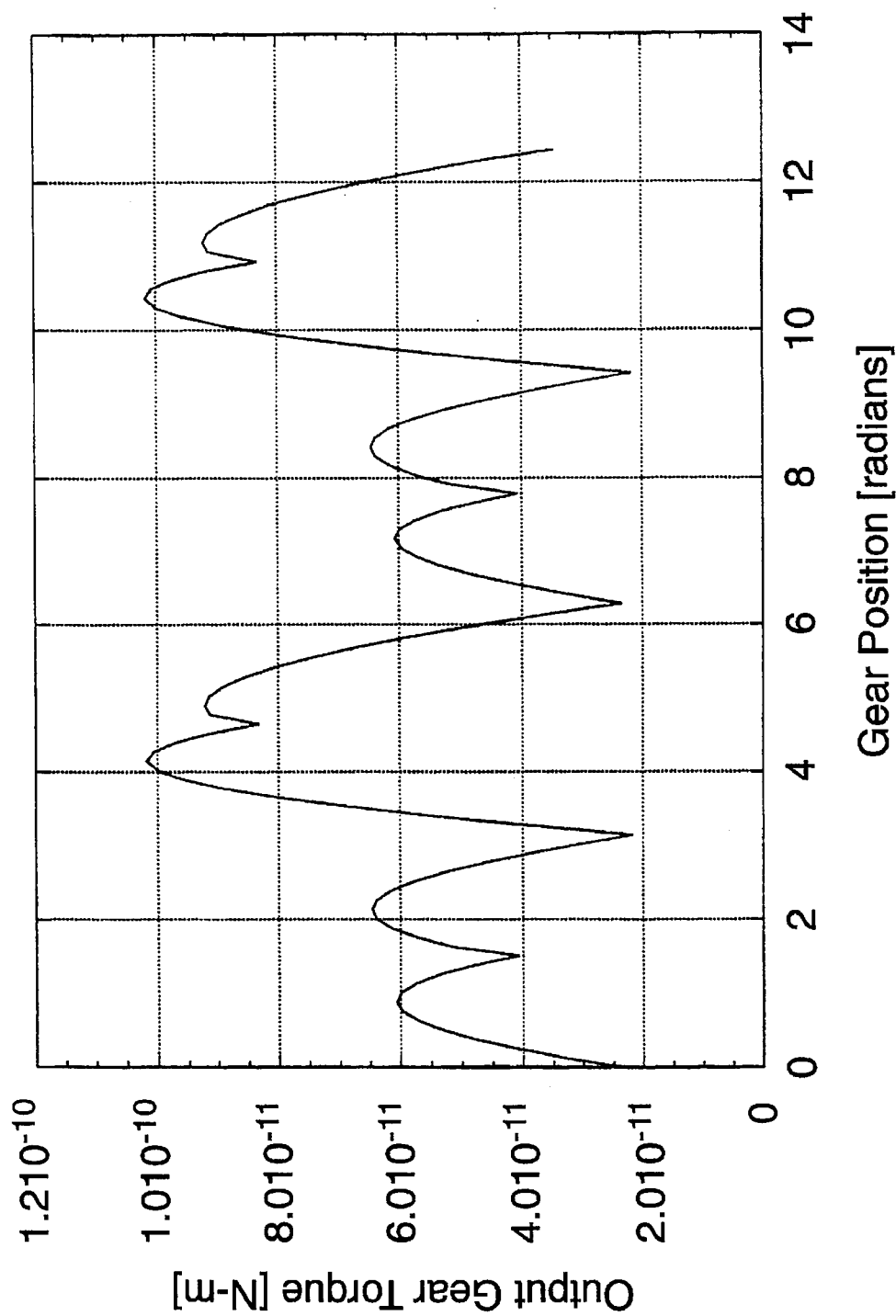
FIG. 8 is a graphical illustration of calculated output torques as a function of angle for a specific electrostatic rotary microengine.

Mechanical modelling of the system, which includes a conservative estimate of friction, indicates that positive drive torque can be generated throughout a complete revolution of the output gear. As explained previously, specific sequencing of the forces generated by the X and Y actuators is required to obtain usable output torque and hence motion. FIG. 7 illustrates the sequencing of input forces used to drive the output gear. The applied forces are input as "square" waves. FIG. 8 presents a quasi-static analysis which shows the available output gear torque for the microengine as a function of angular position of the output gear for a particular set of input parameters, i.e., applied voltage, friction coefficient, and actuator structural stiffness.

Figure 9:
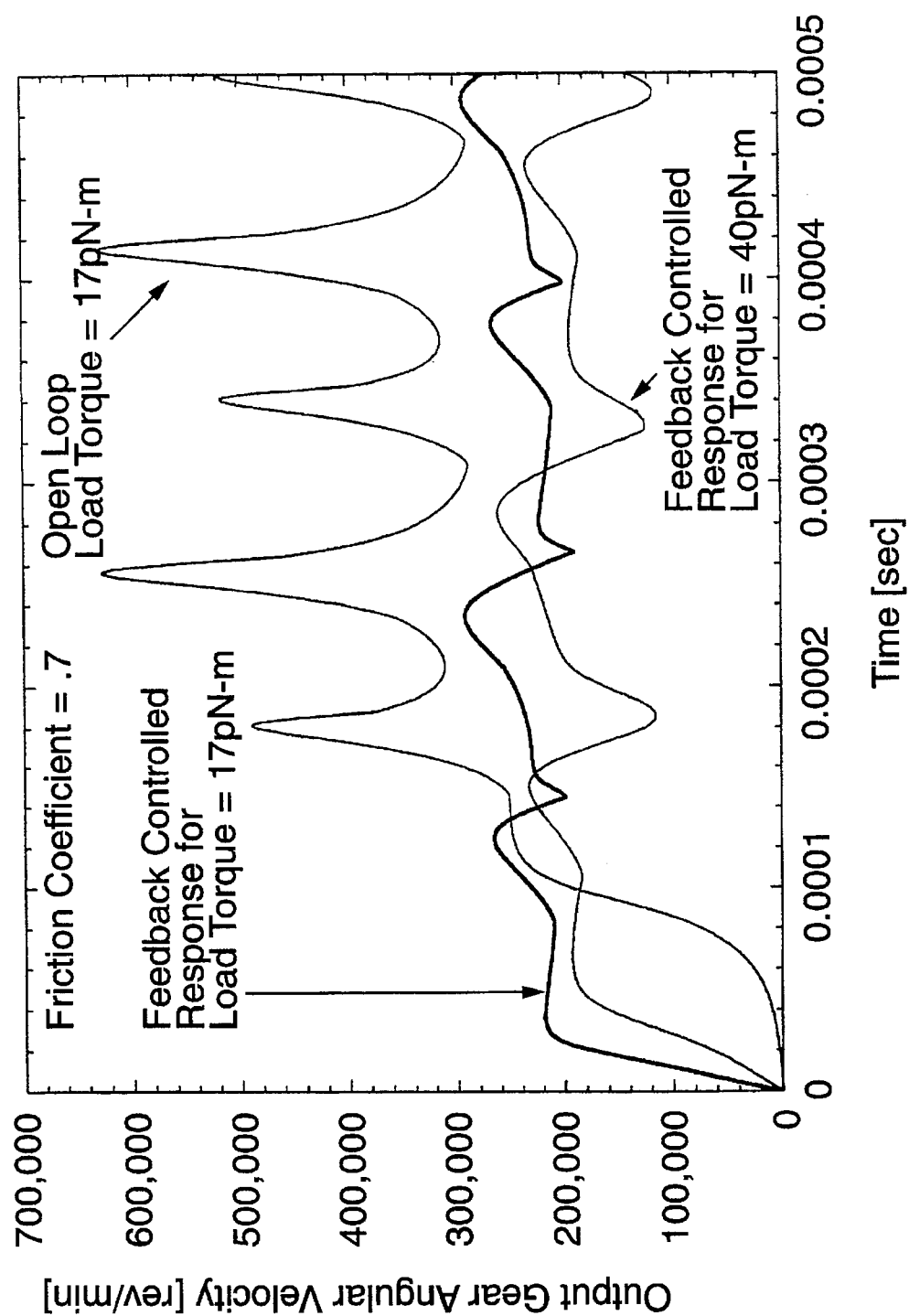
FIG. 9 is a plot of output gear angular velocities for 3 drive conditions.

FIG. 9 gives the results from a dynamic analysis of the microengine. Here, the output gear angular velocity is plotted for three drive conditions. One condition is for the case where the input forces are square waves as in FIG. 7. The other two conditions are for instances where the input forces are varied according to a control scheme. It can be seen that the output angular velocity is a function of the load the microengine is driving, and the actuator input force magnitude and sequencing.

Figure 10:
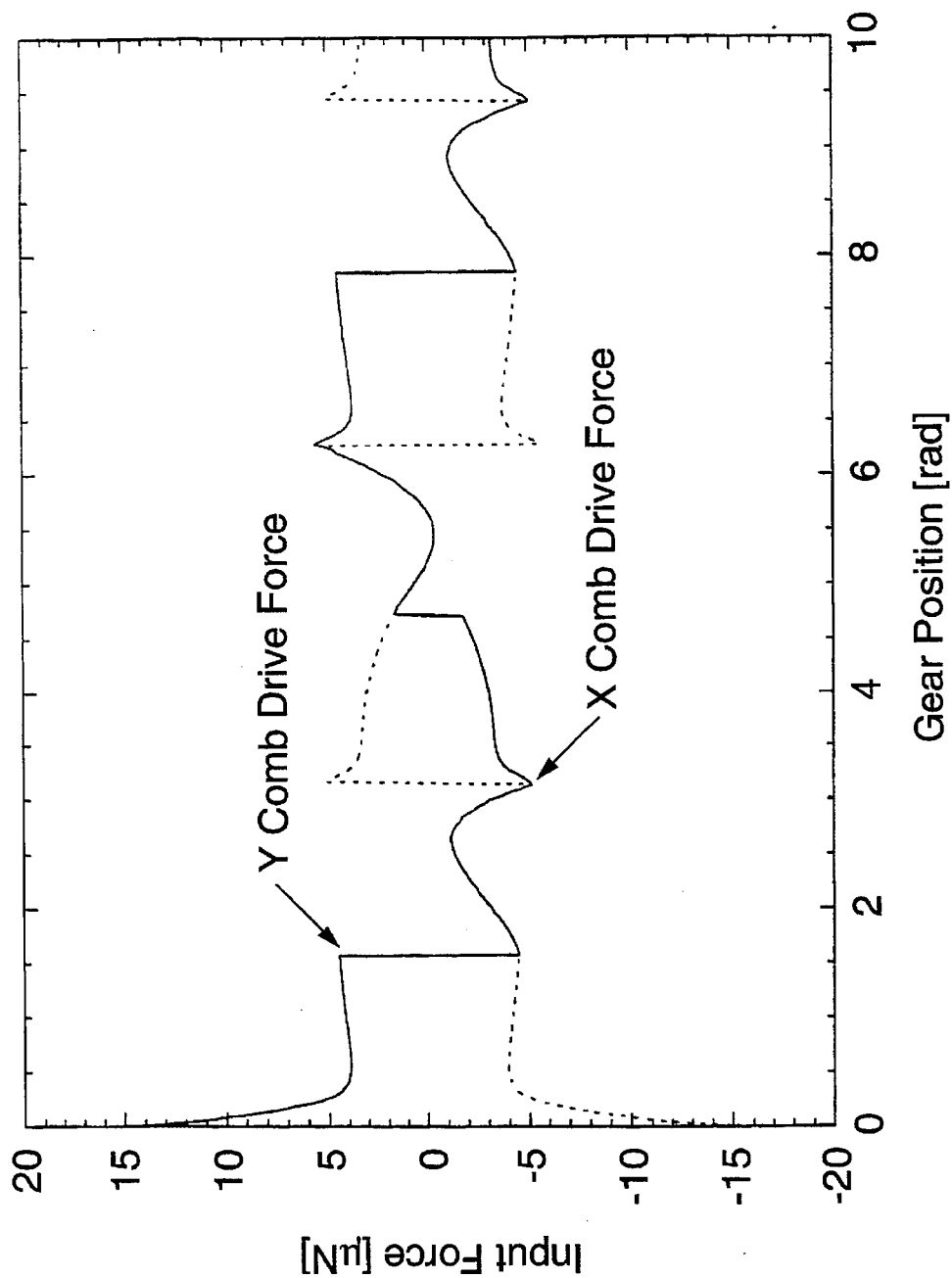
FIG. 10 is a plot of feedback controlled input forces as a function of output gear angle.

If the actuation input forces are changed from the "square wave" inputs to some other signal, the output of the microengine can be "controlled" to give a different response; for example, a constant angular velocity for a given drive torque. Such is the case for the other two curves given in FIG. 9. Here a feedback control system is used to continuously drive the system at a desired angular velocity (e.g. 200,000 rpm). Feedback control of the microengine allows operation at a constant angular velocity by monitoring the actual velocity and comparing this to the desired velocity and adjusting the input to the actuators to either increase or decrease their applied forces. The two curves given in FIG. 9 and designated as "Feedback Controlled Response for Load Torque=17 pN-m" and "Feedback Controlled Response for Load Torque=40 pN-m" are for a simple feedback control scheme that monitors desired output angular velocity (either by capacitive sensing of the position of the actuators, external optical sensing, or through internal feedback via implanted photodiodes) and adjusts the magnitude of the X and Y input forces. FIG. 10 shows the variation of the X and Y input forces when using feedback control for the case where the driven load torque is 17 pN-m. Successful testing of the microengine, using inputs as described in FIG. 7, was carried out. The microengine output gear angular velocity obtained was 600,000 rpm. This corresponds to the maximum signal frequency (10,000 Hz) our software driver test system could deliver. Further dynamic modelling of this specific system indicates that output gear angular velocities exceeding 1,000,000 rpm can be obtained.

Figure 11:
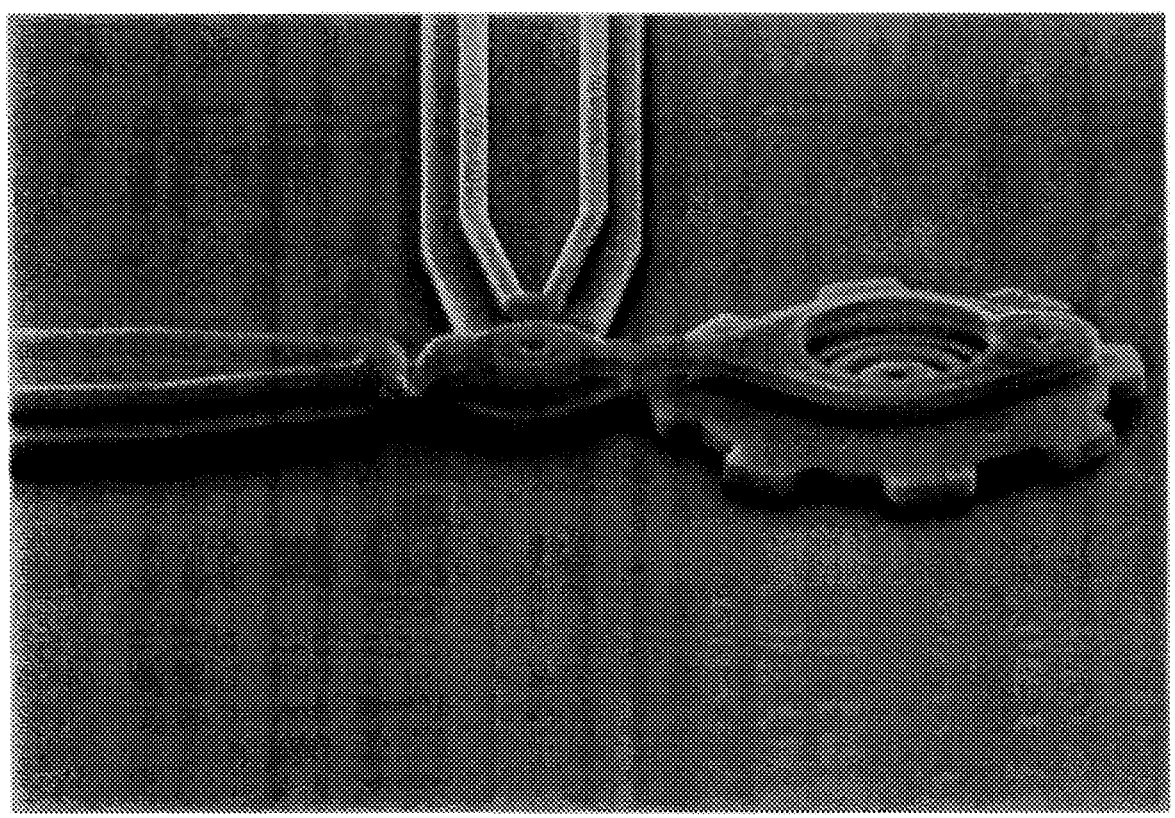
FIG. 11 is a scanning electron micrograph (SEM) of the microengine gear and output assembly.
Figure 12:
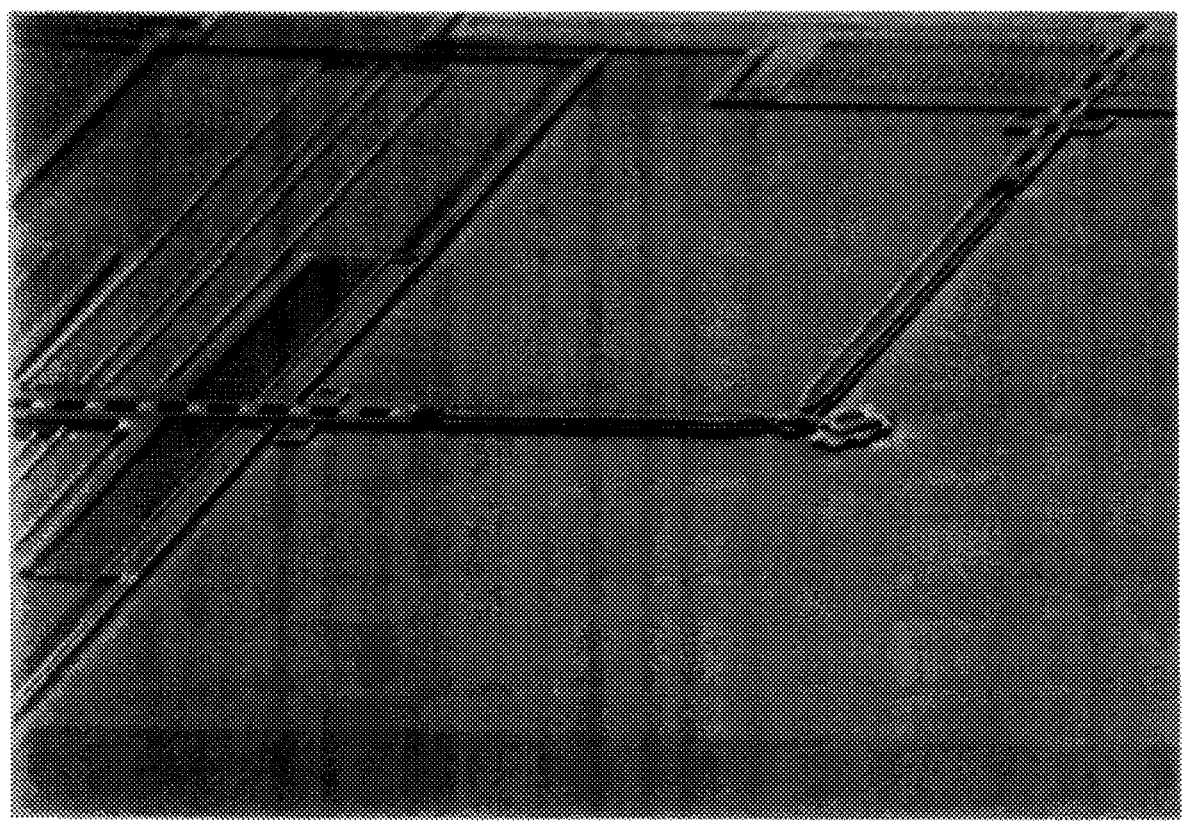
FIG. 12 is a SEM of the microengine showing the output gear, links and portions of the linear actuator.
Figure 13:
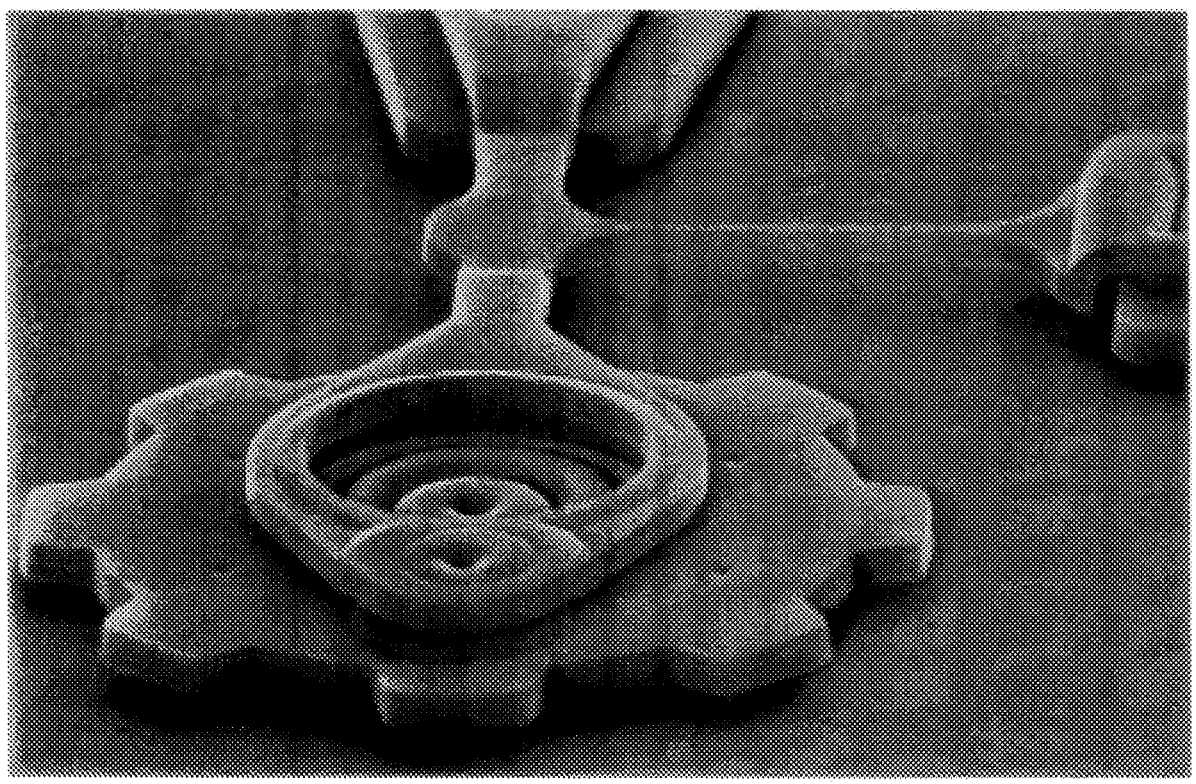
FIG. 13 is a SEM showing a flexible joint.

To further illustrate the configuration of the microengine after fabrication, FIG. 11 is a scanning electron micrograph (SEM) and illustrates the links and output gear assembly of the microengine device. FIG. 12 is an SEM showing links, output gear, and linear actuators for the microengine. FIG. 13 is an SEM illustrating a flex joint at position 34 in FIGS. 4 and 5 which can replace pin joints, thus simplifying mechanical aspects of the microengine.

The microengine would constitute a fundamental power source for operating microsized devices and hence the analogy to macroscale electromagnetic motors. Applications for the microengine would include, positioning, handling, aligning and sorting mechanisms, sensing mechanisms, cutting and slicing tools, material removal tools, driving of pumping mechanisms, microrobotic power sources, micro hard disk drives, switching device operation such as mechanical valves, optical shutters, and electrical switches. Fields of application include defense, medical, manufacturing, consumer products, aviation, automotive, computer, inspection, and safety systems.

The foregoing description of the invention has been presented for purposes of illustration. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated, as long as the principles described herein are followed. Thus, changes can be made in the above-described invention without departing from the intent and scope thereof. Therefore, it is intended that the specification and the examples be considered as exemplary only, with the true scope and spirit of the invention being indicated in the following claims.

What is claimed is:

1. A microengine batch fabricated by polysilicon surface micromachining techniques, comprising:

a substrate base:

a mechanical output gear made rotatably secured by a central flanged restraining hub formed on and attached to said substrate base, said gear having a center and an outer perimeter, said gear for providing direct rotational power to a micromechanism;

a linear actuator means formed on said substrate base and linked to said mechanical output gear near said outer perimeter by a linkage means, said linear actuator means for causing rotation of said mechanical output gear; and a linkage means for linking said linear actuator means to said mechanical output gear wherein said linkage means is rotatably connected to said gear between the center and the outer perimeter of said gear.

2. The invention of claim 1 wherein said actuator means further comprises a first linear actuator and a second linear actuator wherein said first linear actuator is rotatably connected by said linkage means to said output gear and said second linear actuator is rotatably connected to said linkage means at a point between said first linear actuator and said output gear.

3. The invention of claim 2 wherein said linear actuators are timed in order to provide linear oscillatory motion to said linkage means in the X and Y directions according to a desired position, rotational direction and speed of said mechanical output means.

4. The invention of claim 3 wherein said actuators are electrostatic comb drive actuators.

5. The invention of claim 4 wherein said mechanical output means is a gear further comprises teeth at its outermost perimeter, said teeth for directly contacting a micromechanism.

6. The invention of claim 5 wherein said invention is fabricated of polysilicon on one wafer using surface micromachining batch fabrication.

7. The invention of claim 1 wherein said linkage means is flexible to allow rotational motion at said output means.

8. The invention of claim 7 wherein said invention is fabricated of polysilicon on one wafer using surface micromachining batch fabrication.

9. A microengine batch fabricated by polysilicon surface micromachining techniques, comprising:

a mechanical output gear formed upon and rotatably attached to a substrate base by a central flanged restraining hub that is formed on and attached to said substrate base, said gear for providing rotational motion and power to a mechanical load;

a first linear actuator formed on said substrate base and positioned along an X axis relative to said output gear;

a second linear actuator formed on said substrate base and positioned along a Y axis relative to said output gear and said first linear actuator wherein said second actuator is positioned between said output gear and said first linear actuator;

a first linkage means for rotatably linking said first linear actuator to said output gear, wherein said linkage is connected to said output gear near said output gear's outer perimeter; and a second linkage means for linking said second linear actuator to said first linkage means.

10. The invention of claim 9 wherein said linear actuators are timed in order to provide linear oscillatory motion to said linkage means in the X and Y directions according to a desired position, rotational direction and speed of said mechanical output means.

11. The invention of claim 10 wherein said actuators are electrostatic comb drive actuators.

12. The invention of claim 11 wherein said mechanical output gear further comprises teeth on its outer perimeter, said teeth for directly contacting a micromechanism.

13. The invention of claim 12 wherein said microengine output gear is fabricated on a silicon substrate and is smaller than 40 micrometers in diameter.

14. The invention of claim 9 wherein said linkage means is flexible to allow rotational motion at said output means.

15. The invention of claim 14 wherein said microengine is fabricated on a silicon substrate and is smaller than 9 micrometers in thickness.

16. A microfabricated microengine made of polysilicon on a silicon substrate base, comprising:

a mechanical output gear having teeth on its outermost surface for providing rotational motion to a mechanical load;

a retaining hub formed on and attached to said substrate base for rotatably securing said output gear and allowing the output gear to rotate;

a first linear actuator formed on said substrate base and positioned along the X axis relative to said output gear;

a second linear actuator formed on said substrate base and positioned along the Y axis relative to said output gear wherein said second actuator is positioned between said output gear and said first linear actuator;

a first linkage means for rotatably linking said first linear actuator to said output gear, wherein said linkage is rotatably connected to said output gear near said output gear's perimeter; and a second linkage means for flexibly linking said second linear actuator to said first linkage means.

17. The invention of claim 16 wherein said linear actuators are timed in order to provide linear oscillatory motion said linkage means in X and Y directions relative to said mechanical output gear and according to a desired position, rotational direction and speed of said mechanical output means.

18. The invention of claim 17 wherein said actuators are electrostatic comb drive actuators.

19. The invention of claim 16 wherein said linkage means is flexible to allow rotational motion at said output means.

20. The invention of claim 16 wherein said gear is retained by a retaining means which allows said gear to rotate freely.

21. The invention of claim 16 wherein said output gear is smaller than 40 micrometers and said microengine is smaller than 9 micrometers in thickness.

* * * * *